US012247618B2

(12) United States Patent
Dimartino et al.

(10) Patent No.: US 12,247,618 B2
(45) Date of Patent: Mar. 11, 2025

(54) ELECTRICALLY CONDUCTIVE BEARING WITH RIB AND METHOD OF MAKING AND USING THE SAME

(71) Applicant: SAINT-GOBAIN PERFORMANCE PLASTICS CORPORATION, Solon, OH (US)

(72) Inventors: Vincent Dimartino, Clifton, NJ (US); Baltasar R. Garcia, Mahwah, NJ (US); Florian Foerster, Duisburg (DE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 94 days.

(21) Appl. No.: 18/068,626

(22) Filed: Dec. 20, 2022

(65) Prior Publication Data

US 2023/0193952 A1 Jun. 22, 2023

Related U.S. Application Data

(60) Provisional application No. 63/265,801, filed on Dec. 21, 2021.

(51) Int. Cl.
*F16C 33/12* (2006.01)
*F16C 17/02* (2006.01)
(Continued)

(52) U.S. Cl.
CPC ............ *F16C 33/124* (2013.01); *F16C 17/02* (2013.01); *F16C 27/02* (2013.01); *F16C 41/002* (2013.01);
(Continued)

(58) Field of Classification Search
CPC .......... F16C 17/02; F16C 25/04; F16C 27/02; F16C 33/12; F16C 33/121; F16C 33/122;
(Continued)

(56) References Cited

U.S. PATENT DOCUMENTS 545,800 A 9/1895 Kempshall
688,431 A 12/1901 Neubert
(Continued)

FOREIGN PATENT DOCUMENTS

AT 515701 A4 11/2015
CA 2075261 A1 8/1993
(Continued)

OTHER PUBLICATIONS

International Search Report and Written Opinion for PCT/EP2018/075911, mailed Nov. 21, 2018, 13 pages.
International Search Report and Written Opinion for PCT/US2020/063246, mailed Mar. 26, 2021, 11 pages.
International Search Report and Written Opinion for PCT/EP2020/081326, mailed Feb. 18, 2021, 14 pages.
(Continued)

*Primary Examiner* — Alan B Waits
(74) *Attorney, Agent, or Firm* — Abel Schillinger, LLP; Ann Palma (57) ABSTRACT

A bearing including a sidewall including an electrically conductive substrate, and an electrically non-conductive or low-conductive sliding layer coupled to the substrate, where the sidewall includes at least one circumferential rib feature protruding radially inward or radially outward from a bore defining a central axis, where the at least one circumferential rib feature has an aspect ratio between a circumferential length and an axial width of at least 2:1, where the circumferential rib feature is adapted to contact an opposing component such that at a point of contact the bearing has a void area free of sliding layer so as to provide electrical conductivity between the bearing and the opposing component.

20 Claims, 5 Drawing Sheets

(51) Int. Cl.
    *F16C 27/02* (2006.01)
    *F16C 41/00* (2006.01)
(52) U.S. Cl.
    CPC ...... *F16C 2202/32* (2013.01); *F16C 2204/60* (2013.01); *F16C 2208/58* (2013.01); *F16C 2240/60* (2013.01)
(58) Field of Classification Search
    CPC ...... F16C 33/124; F16C 33/125; F16C 33/24; F16C 41/002; F16C 2202/32; F16C 2204/60; F16C 2208/58
    See application file for complete search history.

(56) References Cited

U.S. PATENT DOCUMENTS

| | | |
|---|---|---|
| 2,722,047 A | 11/1955 | Cousino |
| 3,177,559 A | 4/1965 | Boschi et al. |
| 3,311,432 A | 3/1967 | Owles |
| 3,355,695 A | 11/1967 | Overesch |
| 3,921,225 A | 11/1975 | Suska |
| 3,957,939 A | 5/1976 | Voaden |
| 4,116,019 A | 9/1978 | Welschof |
| 4,638,538 A | 1/1987 | Kohama et al. |
| 4,721,406 A | 1/1988 | Davis |
| 5,075,928 A | 12/1991 | Bobrowski |
| 5,112,146 A | 5/1992 | Stangeland |
| 5,169,244 A | 12/1992 | Siebert et al. |
| 5,273,369 A | 12/1993 | Strobl |
| 5,385,413 A | 1/1995 | Murphy et al. |
| 5,707,193 A | 1/1998 | Hasegawa |
| 5,906,029 A | 5/1999 | Fox |
| 6,149,310 A | 11/2000 | Ono et al. |
| 6,164,830 A | 12/2000 | Nitzsche et al. |
| 6,231,239 B1 | 5/2001 | Damour et al. |
| 6,376,952 B1 | 4/2002 | Stenta |
| 6,669,370 B1 | 12/2003 | Storch et al. |
| 7,174,765 B2 | 2/2007 | Kirchhof et al. |
| 7,661,960 B2 | 2/2010 | Tanoi et al. |
| 7,922,418 B2 * | 4/2011 | Baker ............... G11B 5/4813 403/372 |
| 8,505,164 B2 | 8/2013 | Katou |
| 8,746,981 B2 | 6/2014 | Hartmann |
| 8,984,817 B2 | 3/2015 | Weiden et al. |
| 9,022,656 B2 | 5/2015 | Burgeff et al. |
| 9,022,683 B2 | 5/2015 | Nais et al. |
| 9,224,409 B2 * | 12/2015 | Nias ............... F16D 1/0835 |
| 9,297,416 B2 | 3/2016 | Ziegler et al. |
| 9,343,862 B2 | 5/2016 | Zink et al. |
| 9,543,801 B2 | 1/2017 | Horng |
| 9,771,973 B2 | 9/2017 | Ambroise et al. |
| 9,869,330 B2 * | 1/2018 | Kinoshita ............ F16B 2/00 |
| 10,087,984 B2 | 10/2018 | Hunter et al. |
| 10,228,016 B2 | 3/2019 | Hartmann et al. |
| 10,371,213 B2 * | 8/2019 | Slayne ............... F16D 1/0835 |
| 10,738,519 B2 | 8/2020 | Eisenschenk et al. |
| 11,005,334 B2 * | 5/2021 | Childs ............... B32B 25/10 |
| 11,428,267 B2 | 8/2022 | Haines et al. |
| 2005/0034267 A1 | 2/2005 | Fukushima et al. |
| 2005/0269329 A1 | 12/2005 | Baughman |
| 2006/0008190 A1 | 1/2006 | Hamada et al. |
| 2006/0228174 A1 | 10/2006 | Woodhead et al. |
| 2007/0291417 A1 * | 12/2007 | Woodhead ............ G11B 33/121 |
| 2009/0224618 A1 | 9/2009 | Bhatti |
| 2011/0002565 A1 | 1/2011 | Ambroise et al. |
| 2011/0049834 A1 | 3/2011 | Natu |
| 2011/0076096 A1 * | 3/2011 | Slayne ............... F16C 29/002 403/372 |
| 2011/0150375 A1 | 6/2011 | Jaeger et al. |
| 2012/0005859 A1 | 1/2012 | Herglotz et al. |
| 2012/0106882 A1 | 5/2012 | Ponnouradjou et al. |
| 2012/0128280 A1 | 5/2012 | Ortiz et al. |
| 2012/0240350 A1 * | 9/2012 | Natu ............... B62K 21/06 16/2.2 |
| 2013/0067689 A1 | 3/2013 | Mitchell et al. |
| 2013/0315654 A1 | 11/2013 | Nias et al. |
| 2014/0044385 A1 | 2/2014 | Andelkovski |
| 2014/0185164 A1 | 7/2014 | Nias et al. |
| 2015/0063734 A1 | 3/2015 | Duch |
| 2015/0114549 A1 | 4/2015 | Slayne et al. |
| 2015/0285306 A1 | 10/2015 | Akyol et al. |
| 2016/0348717 A1 | 12/2016 | Churchley |
| 2017/0002858 A1 | 1/2017 | Hunter et al. |
| 2017/0227047 A1 | 8/2017 | Fujiwara |
| 2017/0363140 A1 | 12/2017 | Hatmann et al. |
| 2019/0093401 A1 | 3/2019 | Hoenig et al. |
| 2019/0190345 A1 * | 6/2019 | Childs ............... F16F 1/37 |
| 2019/0360521 A1 | 11/2019 | Schmidt |
| 2020/0173485 A1 | 6/2020 | Kuemmel et al. |
| 2020/0378443 A1 * | 12/2020 | Greinwald ............ F16C 17/107 |
| 2021/0140486 A1 | 5/2021 | Haines et al. |
| 2021/0172475 A1 | 6/2021 | Li et al. |
| 2023/0003259 A1 | 1/2023 | Fluegge et al. |
| 2023/0027214 A1 | 1/2023 | Zlebek et al. |

FOREIGN PATENT DOCUMENTS

| | | |
|---|---|---|
| CA | 2745022 A1 | 12/2012 |
| CN | 86102189 A | 10/1987 |
| CN | 102630281 A | 8/2012 |
| CN | 103518070 A | 1/2014 |
| CN | 106151269 A | 11/2016 |
| CN | 108386448 A | 8/2018 |
| CN | 109312774 A | 2/2019 |
| CN | 109477519 A | 3/2019 |
| CZ | 2007784 A3 | 5/2009 |
| DE | 1775588 A1 | 9/1971 |
| DE | 2818014 A1 | 11/1979 |
| DE | 3908026 C2 | 11/1993 |
| DE | 4425491 A1 | 2/1995 |
| DE | 19626279 A1 | 1/1998 |
| DE | 19960736 C1 | 7/2001 |
| DE | 202005005827 U1 | 6/2005 |
| DE | 102007033647 A1 | 1/2009 |
| DE | 202008014995 U1 | 3/2009 |
| DE | 102007052104 A1 | 6/2009 |
| DE | 102011077728 A1 | 12/2012 |
| DE | 102011087530 A1 | 6/2013 |
| DE | 102018131181 B3 | 2/2020 |
| DE | 102019110734 A1 | 10/2020 |
| EP | 0307112 A2 | 3/1989 |
| EP | 1234988 A2 | 8/2002 |
| EP | 1582275 B1 | 5/2007 |
| EP | 2058536 A1 | 5/2009 |
| EP | 2476566 A1 | 7/2012 |
| EP | 2480797 B1 | 5/2016 |
| EP | 2957784 B1 | 4/2019 |
| EP | 3498956 A1 | 6/2019 |
| EP | 3976979 A1 | 4/2022 |
| GB | 1237075 A | 6/1971 |
| GB | 2237059 A | 4/1991 |
| JP | S51158950 U | 12/1976 |
| JP | S61115625 A | 6/1986 |
| JP | S6317011 B2 | 4/1988 |
| JP | 3009484 U | 4/1995 |
| JP | H09242757 A | 9/1997 |
| JP | H11132236 A | 5/1999 |
| JP | 2000027904 A | 1/2000 |
| JP | 2000046056 A | 2/2000 |
| JP | 2003172338 A | 6/2003 |
| JP | 2003278760 A | 10/2003 |
| JP | 2003278761 A | 10/2003 |
| JP | 2007092845 A | 4/2007 |
| JP | 2009014164 A | 1/2009 |
| JP | 4442059 B2 | 3/2010 |
| JP | 2014505836 A | 3/2014 |
| JP | 2014509721 A | 4/2014 |
| JP | 2015230628 A | 12/2015 |
| JP | 2016169816 A | 9/2016 |
| JP | 6195053 B2 | 9/2017 |
| JP | 2018510307 A | 4/2018 |
| JP | 2018519486 A | 7/2018 |
| KR | 20130097812 A | 9/2013 |
| KR | 20140090697 A | 7/2014 |

(56) References Cited

FOREIGN PATENT DOCUMENTS

| | | |
|---|---|---|
| KR | 101514228 B1 | 4/2015 |
| KR | 20170045456 A | 4/2017 |
| KR | 1020180005759 A | 1/2018 |
| WO | 2005105431 A1 | 11/2005 |
| WO | 2016060660 A1 | 4/2016 |
| WO | 2016156507 A1 | 10/2016 |
| WO | 2017003927 A1 | 1/2017 |
| WO | 2017103117 A1 | 6/2017 |
| WO | 2018058192 A1 | 4/2018 |
| WO | 2019063524 A1 | 4/2019 |
| WO | 2020245129 A1 | 12/2020 |
| WO | 2021089804 A1 | 5/2021 |
| WO | 2021113599 A1 | 6/2021 |
| WO | 2023275368 A1 | 1/2023 |

OTHER PUBLICATIONS

Smith J W: "Presenting examples of Motor-Overload-Protection applications from the Appliance and Automotive industries", IEEE Industry Applications Magazine, IEEE Service Center, Piscataway, NJ, US, vol. 8, No. 5, Sep. 1, 2002 (Sep. 1, 2002), pp. 74-82, XP011093338, ISSN: 1077-2618, DOI: 10. 1109/MIA.2002. 1028393 p. 74-p. 82; figures 1-17.

International Search Report and Written Opinion for PCT/EP2022/069920, mailed Nov. 2, 2022, 17 pages.

International Search Report and Written Opinion for PCT/US2022/081992, mailed Apr. 21, 2023, 13 pages.

International Search Report and Written Opinion for PCT/EP2022/068302, mailed Dec. 12, 2022, 15 pages.

\* cited by examiner

FIG. 6D

ELECTRICALLY CONDUCTIVE BEARING WITH RIB AND METHOD OF MAKING AND USING THE SAME

CROSS-REFERENCE TO RELATED APPLICATION(S)

This application claims priority under 35 U.S.C. § 119(e) to U.S. Provisional Application No. 63/265,801, entitled "ELECTRICALLY CONDUCTIVE BEARING WITH RIB AND METHOD OF MAKING AND USING THE SAME," by Vincent DIMARTINO et al., filed Dec. 21, 2021, which is assigned to the current assignee hereof and incorporated herein by reference in its entirety.

FIELD OF THE DISCLOSURE

This disclosure generally relates to bearings and, in particular, to bearings having an electrical conduction path.

BACKGROUND

Commonly, bearings constrain relative movement to the desired motion and reduce friction between moving parts. One particular type bearing may be located in a gap between the outer surface of an inner component and the inner surface of the bore of an outer component within an assembly. Exemplary assemblies may include door, hood, tailgate, and engine compartment hinges, seats, steering columns, flywheels, driveshaft assemblies, or may include other assemblies notably those used in automotive applications. Sometimes, there exists a need to have certain electrical properties across components such as the inner component (such as a shaft) and the outer component (such as a housing) in such an assembly. Therefore, there exists an ongoing need for improved bearings that provide improved electrical properties while maintaining a longer lifetime of the assembly.

BRIEF DESCRIPTION OF THE DRAWINGS

The present disclosure may be better understood, and its numerous features and advantages made apparent, to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or assembly that comprises a list of features is not necessarily limited only to those features but may include other features not expressly listed or inherent to such method, article, or assembly. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Embodiments of the invention may include a bearing including: a sidewall including an electrically conductive substrate, and an electrically non-conductive or low-conductive sliding layer coupled to the substrate, where the sidewall includes at least one circumferential rib feature protruding radially inward or radially outward from a bore defining a central axis, where the at least one circumferential rib feature has an aspect ratio between a circumferential length and an axial width of at least 2:1, where the circumferential rib feature is adapted to contact an opposing component such that at a point of contact the bearing has a void area free of sliding layer so as to provide electrical conductivity between the bearing and the opposing component.

Embodiments of the invention may include an assembly including: an outer component; an inner component; and a bearing disposed between component and second component, where the bearing includes a generally cylindrical sidewall including an electrically conductive substrate, and an electrically non-conductive or low-conductive sliding layer coupled to the substrate, where the generally cylindrical sidewall includes at least one circumferential rib feature protruding radially inward or radially outward from a bore defining a central axis, where the at least one circumferential rib feature has an aspect ratio between a circumferential length and an axial width of at least 2:1, where the circumferential rib feature is adapted to contact the outer component or the inner component at a point of contact, where at the point of contact, the bearing has a void area free of sliding layer so as to provide electrical conductivity between the outer component and the inner component.

Embodiments of the invention may include an assembly including: an outer component having a bore defining a central axis; an inner component disposed in the bore of the outer component; and a bearing disposed between inner component and outer component, where the bearing includes a generally cylindrical sidewall including an electrically conductive substrate, and an electrically non-conductive or low-conductive sliding layer coupled to the substrate, where the generally cylindrical sidewall includes at least one circumferential rib feature protruding radially inward or radially outward from the central axis, where the at least one circumferential rib feature has an aspect ratio between a circumferential length and an axial width of at least 2:1, where the bearing has an uninstalled configuration where the bearing is electrically non-conductive, and an installed configuration where the bearing is electrically conductive, where electrically low-conductive is defined as having an electrical resistivity value of greater than 10 Ω·m measured from a radially outward side of the bearing to a radially inward side of the bearing along a radially extending line from the central axis that intersects the bearing perpendicular to the central axis.

Embodiments of the invention may include a method of forming and installing a bearing, including: providing a bearing that is electrically non-conductive or low-conductive, an inner component, and an outer component, where the bearing includes a generally cylindrical sidewall including an electrically conductive substrate, and an electrically non-conductive or low-conductive sliding layer coupled to the substrate, where the generally cylindrical sidewall includes at least one circumferential rib feature protruding radially inward or radially outward from a bore defining a central axis where the at least one circumferential rib feature has an aspect ratio between a circumferential length and an axial width of at least 2:1; joining the bearing to one of the inner and outer components to form a sub-assembly; and joining the other of the inner and outer components to the sub-assembly to form an assembly, such that the bearing becomes electrically conductive, and forming an electrically conductive circuit between the inner component, the bearing, and the outer component, where electrically non-conductive or low-conductive is defined as having an electrical resistivity value of greater than 10 Ω·m measured from a radially outward side of the bearing to a radially inward side of the bearing along a radially extending line from the central axis that intersects the bearing perpendicular to the central axis.

Embodiments of the invention may include a method of forming a bearing, including: providing a blank including an electrically conductive substrate, and an electrically non-conductive or low-conductive sliding layer coupled to the substrate; forming at least one circumferential rib feature in the blank, where the at least one circumferential rib feature has an aspect ratio between a circumferential length and an axial width of at least 2:1; forming the blank into a bearing including a generally cylindrical sidewall where the circumferential rib feature protrudes radially inward or radially outward from the generally cylindrical sidewall, removing sliding layer from the circumferential rib feature to form a void area free of sliding layer adapted to contact an inner component or an outer component so as to provide electrical conductivity between the inner component and the outer component.

Figure 1:
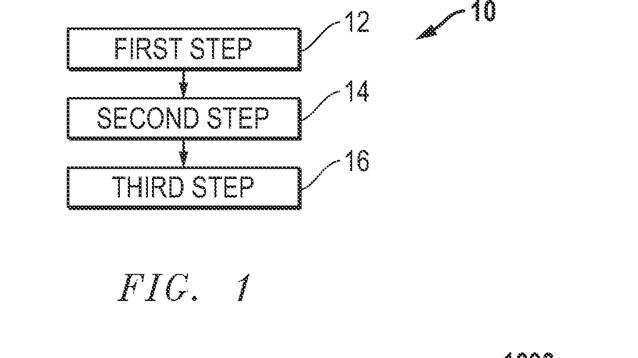
FIG. 1 includes a method of producing a bearing in accordance with an embodiment.

For purposes of illustration, FIG. 1 includes a method of producing a bearing in accordance with an embodiment. The forming process 10 may include a first step 12 of providing a base material, a second step 14 of coating the base material with a low friction coating to form a composite material and a third step 16 of forming the composite material into a bearing.

Referring to the first step 12, the base material may be a substrate. In an embodiment, the substrate can at least partially include a metal. According to certain embodiments, the metal may include iron, copper, titanium, tin, aluminum, alloys thereof, or may be another type of material. More particularly, the substrate can at least partially include a steel, such as, a stainless steel, carbon steel, or spring steel. For example, the substrate can at least partially include a 301 stainless steel. The 301 stainless steel may be annealed, ¼ hard, ½ hard, ¾ hard, or full hard. Moreover, the steel can include stainless steel including chrome, nickel, or a combination thereof. A particular stainless steel is 301 stainless steel. The substrate may include a woven mesh or an expanded metal grid. Alternatively, the woven mesh can be a woven polymer mesh. In an alternate embodiment, the substrate may not include a mesh or grid. The substrate may include a conductive material.

In a number of embodiments, the substrate may be spring steel. The spring steel substrate can be may be annealed, ¼ hard, ½ hard, ¾ hard, or full hard. The spring steel substrate may have a tensile strength of not less than 600 MPa, such as not less than 700 MPa, such as not less than 750 MPa, such as not less than 800 MPa, such as not less than 900 MPa, or such as not less than 1000 MPa. The spring steel substrate may have a tensile strength of no greater than 1500 MPa, or such as no greater than 1250 MPa.

Figure 2A:
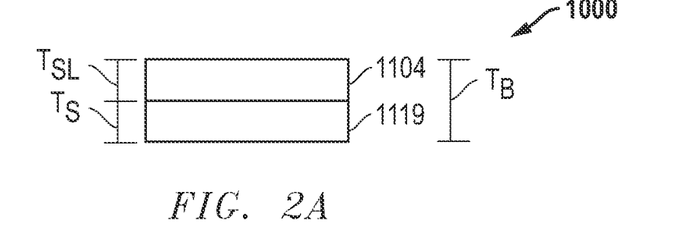
FIG. 2A includes a cross-sectional view of a composite material that may form a bearing in accordance with an embodiment.

FIG. 2A includes an illustration of the composite material 1000 that may be formed according to first step 12 and second step 14 of the forming process 10. For purposes of illustration, FIG. 2A shows the layer by layer configuration of a composite material 1000 after second step 14. In a number of embodiments, the composite material 1000 may include a substrate 1119 (i.e., the base material provided in the first step 12) and a sliding layer 1104 (i.e., the low friction coating applied in second step 14). As shown in FIG. 2A, the sliding layer 1104 can be coupled to at least a portion of the substrate 1119. In a particular embodiment, the sliding layer 1104 can be coupled to a surface of the substrate 1119 so as to form a low friction interface with another surface of another component. The sliding layer 1104 can be coupled to the radially inner surface of the substrate 1119 so as to form a low friction interface with another surface of another component. The sliding layer 1104 can be coupled to the radially outer surface of the substrate 1119 so as to form a low friction interface with another surface of another component.

In a number of embodiments, the sliding layer 1104 can include a low friction material. Low friction materials may include, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoroploymer, a polyamide, a polybenzimidazole, or any combination thereof. In an example, the sliding layer 1104 includes a polyketone, a polyaramid, a polyimide, a polyetherimide, a polyamideimide, a polyphenylene sulfide, a polyphenylene sulfone, a fluoropolymer, a polybenzimidazole, a derivative thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The sliding layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. Fluoropolymers may be used according to particular embodiments. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0. The sliding layer 1104 may be an electrically non-conductive or low-conductive sliding material, e.g. includes a material that is non-conductive or low-conductive.

In a number of embodiments, the sliding layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 1 wt % based on the total weight of the sliding layer, such as at least 5 wt %, or even 10 wt % based on the total weight of the sliding layer.

The substrate 1119 can have a thickness Ts of between about 10 microns to about 1500 microns, such as between about 50 microns and about 1000 microns, such as between about 100 microns and about 750 microns, such as between about 350 microns and about 650 microns. In a number of embodiments, the substrate 1119 may have a thickness Ts of between about 700 and 800 microns. In a number of embodiments, the substrate 1119 may have a thickness Ts of between about 950 and 1050 microns. It will be further appreciated that the thickness Ts of the substrate 1119 may be any value between any of the minimum and maximum values noted above. The thickness of the substrate 1119 may be uniform, i.e., a thickness at a first location of the substrate 1119 can be equal to a thickness at a second location therealong. The thickness of the substrate 1119 may be non-uniform, i.e., a thickness at a first location of the substrate 1119 can be different from a thickness at a second location therealong.

In an embodiment, the sliding layer 1104 can have a thickness $T_{SL}$ of between about 1 micron to about 500 microns, such as between about 10 microns and about 350 microns, such as between about 30 microns and about 300 microns, such as between about 40 microns and about 250 microns. In a number of embodiments, the sliding layer 1104 may have a thickness $T_{SL}$ of between about 50 and 300 microns. It will be further appreciated that the thickness $T_{SL}$ of the sliding layer 1104 may be any value between any of the minimum and maximum values noted above. The thickness of the sliding layer 1104 may be uniform, i.e., a thickness at a first location of the sliding layer 1104 can be equal to a thickness at a second location therealong. The thickness of the sliding layer 1104 may be non-uniform, i.e., a thickness at a first location of the sliding layer 1104 can be different from a thickness at a second location therealong. It can be appreciated that different sliding layers 1104 may have different thicknesses. The sliding layer 1104 may overlie one major surface of the substrate 1119, shown, or overlie both major surfaces. The substrate 1119 may be at least partially encapsulated by the sliding layer 1104. That is, the sliding layer 1104 may cover at least a portion of the substrate 1119. In a number of embodiments, the sliding layer 1104 may encapsulate the substrate 1119 such that at least one of the radial inner and outer surfaces of the substrate 1119 may be located within the sliding layer 1119. Axial surfaces of the substrate 1119 may be exposed from the sliding layer 1104. The encapsulating step may be performed by calendaring or laminating through the apertures in the sheet. The sheet may be formed into a substrate 1119 having radial inner and outer surfaces.

Figure 2B:
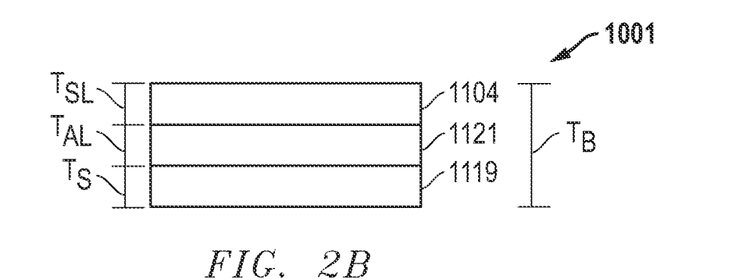
FIG. 2B includes a cross-sectional view of a composite material that may form a bearing in accordance with an embodiment.

FIG. 2B includes an illustration of an alternative embodiment of the composite material that may be formed according to first step 12 and second step 14 of the forming process 10. For purposes of illustration, FIG. 2B shows the layer by layer configuration of a composite material 1001 after second step 14. According to this particular embodiment, the composite material 1001 may be similar to the composite material 1000 of FIG. 2A, except this composite material 1001 may also include at least one adhesive layer 1121 that may couple the sliding layer 1104 to the substrate 1119 (i.e., the base material provided in the first step 12) and a sliding layer 1104 (i.e., the low friction coating applied in second step 14). In another alternate embodiment, the substrate 1119, as a solid component, woven mesh or expanded metal grid, may be embedded between at least one adhesive layer 1121 included between the sliding layer 1104 and the substrate 1119.

The adhesive layer 1121 may include any known adhesive material common to the bearing arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns. In an embodiment, the hot melt adhesive can have a melting temperature of not greater than 250° C., such as not greater than 220° C.

The adhesive layer 1121 can have a thickness $T_{AL}$ of between about 1 micron to about 80 microns, such as between about 10 microns and about 50 microns, such as between about 20 microns and about 40 microns. In a number of embodiments, the adhesive layer 1121 may have a thickness $T_{AL}$ of between about 3 and 20 microns. In a number of embodiments, the adhesive layer 1121 may have a thickness $T_{AL}$ of between about 10 and 60 microns. It will be further appreciated that the thickness $T_{AL}$ of the adhesive layer 1121 may be any value between any of the minimum and maximum values noted above. The thickness of the adhesive layer 1121 may be uniform, i.e., a thickness at a first location of the adhesive layer 1121 can be equal to a thickness at a second location therealong. The thickness of the adhesive layer 1121 may be non-uniform, i.e., a thickness at a first location of the adhesive layer 1121 can be different from a thickness at a second location therealong.

Figure 2C:
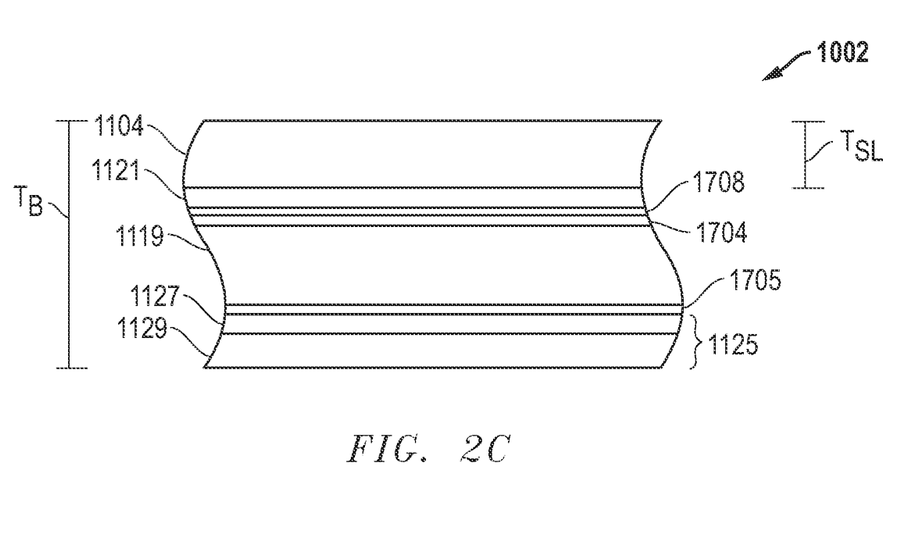
FIG. 2C includes a cross-sectional view a composite material that may form of a bearing in accordance with an embodiment.

FIG. 2C includes an illustration of an alternative embodiment of the composite material that may be formed according to first step 12 and second step 14 of the forming process 10. For purposes of illustration, FIG. 2C shows the layer by layer configuration of a composite material 1002 after second step 14. According to this particular embodiment, the composite material 1002 may be similar to the composite material 1001 of FIG. 2B, except this composite material 1002 may also include at least one corrosion protection layer 1704, 1705, and 1708, and a corrosion resistant coating 1125 that can include an adhesion promoter layer 1127 and an epoxy layer 1129 that may couple to the substrate 1119 (i.e., the base material provided in the first step 12) and a sliding layer 1104 (i.e., the low friction coating applied in second step 14).

The substrate 1119 may be coated with corrosion protection layers 1704 and 1705 to prevent corrosion of the composite material 1002 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, aluminum, a phosphate of zinc, iron, manganese, or any combination thereof, a nano-ceramic layer, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

The composite material 1002 may further include a corrosion resistant coating 1125. The corrosion resistant coating 1125 can have a thickness of about 1 to 50 microns, such as about 5 to 20 microns, and such as about 7 to 15 microns. The corrosion resistant coating 1125 can include a corrosion protection layer 1127 and an epoxy sealing layer 1129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, aluminum, commercially available zinc (mechanical/galvanic) or Zinc-Nickel coatings, or any combination thereof. The epoxy sealing layer 1129 can be a thermal cured epoxy, a UV cured epoxy, an IR cured epoxy, an electron beam cured epoxy, a radiation cured epoxy, or an air cured epoxy. Further, the epoxy sealing layer 1129 can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 1129 can further include a hardening agent. The hardening agent can include amines, acid anhydrides, phenol novolac hardeners such as phenol novolac poly[N-(4-hydroxyphenyl) maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In an embodiment, under step 14 of FIG. 1, any of the layers on the composite material 1000, 1001, 1002, as described above, can each be disposed in a roll and peeled therefrom to join together under pressure, at elevated temperatures (hot or cold pressed or rolled), by an adhesive, or by any combination thereof. Any of the layers of the composite material 1000, as described above, may be laminated together such that they at least partially overlap one another. Any of the layers on the composite material 1000, 1001, 1002, as described above, may be applied together using coating technique, such as, for example, physical or vapor deposition, spraying, plating, powder coating, or through other chemical or electrochemical techniques. In a particular embodiment, the sliding layer 1104 may be applied by a roll-to-roll coating process, including for example, extrusion coating. The sliding layer 1104 may be heated to a molten or semi-molten state and extruded through a slot die onto a major surface of the substrate 1119. In another embodiment, the sliding layer 1104 may be cast or molded.

In an embodiment, the sliding layer 1104 or any layers can be glued to the substrate 1119 using the melt adhesive layer 1121 to form a laminate. In an embodiment, any of the intervening or outstanding layers on the material or composite material 1000, 1001, 1002, may form the laminate. The laminate can be cut into strips or blanks that can be formed into the bearing. The cutting of the laminate may include use of a stamp, press, punch, saw, or may be machined in a different way. Cutting the laminate can create cut edges including an exposed portion of the substrate 1119.

In other embodiments, under step 14 of FIG. 1, any of the layers on the composite material 1000, 1001, 1002, as described above, may be applied by a coating technique, such as, for example, physical or vapor deposition, spraying, plating, powder coating, or through other chemical or electrochemical techniques. In a particular embodiment, the sliding layer 1104 may be applied by a roll-to-roll coating process, including for example, extrusion coating. The sliding layer 1104 may be heated to a molten or semi-molten state and extruded through a slot die onto a major surface of the substrate 1119. In another embodiment, the sliding layer 1104 may be cast or molded.

Referring now to the third step 16 of the forming process 10 as shown in FIG. 1, according to certain embodiments, forming the composite material 1000, 1001, 1002 into a bearing. In an embodiment, the blank of laminate may be shaped into a bearing via molding or stamping (e.g., pressed using a suitably shaped mold, rotary wave forming, etc.). In an embodiment, the forming into a bearing may include a cutting operation. In an embodiment, the cutting operation may include use of a stamp, press, punch, saw, deep draw, or may be machined in a different way. In a number of embodiments, the cutting operation may form a peripheral surface on the bearing. The cutting operation may define a cutting direction initiated from a first major surface to a second major surface, opposite the first major surface, to form the peripheral surfaces or edges. Alternatively, the cutting operation may define a cutting direction initiated from the second major surface to the first major surface to form the peripheral surfaces or edges.

After shaping the bearing, the bearing may be cleaned to remove any lubricants and oils used in the forming and shaping process. Additionally, cleaning can prepare the exposed surface of the substrate for the application of the coating. Cleaning may include chemical cleaning with solvents and/or mechanical cleaning, such as ultrasonic cleaning.

Figure 3A:
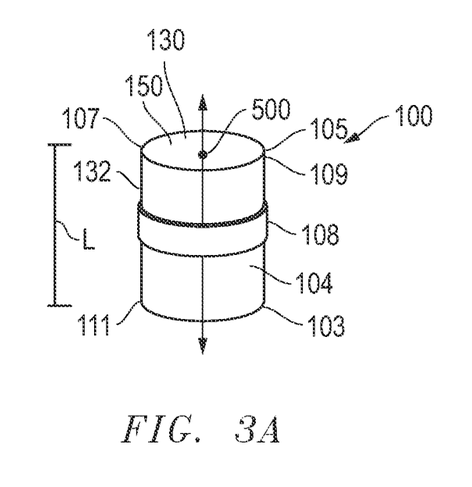
FIG. 3A includes a perspective view of one embodiment of a bearing constructed in accordance with the invention.

FIG. 3A depicts a bearing 100 including one embodiment formed from a blank of material or composite material 1000, 1001, 1002 as described above. In a number of embodiments, the bearing may be a plain bearing. In a number of embodiments, the bearing may be a sliding bearing. The bearing 100 includes a generally cylindrical sidewall 104. The generally cylindrical sidewall 104 may be formed from a blank as described above and include a substrate (e.g. spring steel) that may be curved into a ring-like (substantially annular) shape about a central axis 500, forming an aperture 150. The central axis 500 may be longitudinal down the length of the bearing. The aperture 150 may run down the axial length of the bearing 100 and be adapted to couple to another component of a hinge assembly. The aperture 150 may be parallel or planar to the central axis 500. The aperture 150 formation may include forming shaped holes in the sheet by perforating or stamping. The fabricating of geometrical formations into the sheet may be accomplished by coining, forming or deep drawing waves, balls, or cones to form the sheet profile. The generally cylindrical sidewall 104 may further include a sliding layer that conforms to the shape of the generally cylindrical sidewall 104, as formed as a sliding layer from the blank of composite material 1000, 1001, 1002 as described above. The bearing 100 may include a sidewall 104 forming an annular shape having a first axial end or edge 103 and a second axial end or edge 105. The bearing may have a first outer radial end or edge 107 and a second outer radial end or edge 109. The ends of the generally cylindrical sidewall 104 may not meet (e.g., it may be formed as a split bearing), thereby leaving an axial gap 111 adjacent the circumference of the generally cylindrical sidewall 104. In other embodiments, the generally cylindrical sidewall 104 may be curved so that the ends overlap with one another. In yet further embodiments, the generally cylindrical sidewall 104 may be a continuous, unbroken ring. The bearing 100 and/or generally cylindrical sidewall 104 may have an inner surface 130, and an outer surface 132. The inner surface 130 of the bearing 100 and/or generally cylindrical sidewall 104 may have a sliding layer that conforms to the shape of the generally cylindrical sidewall 104 with the substrate forming the outer surface 132, as formed from the composite material 1000, 1001, 1002 as described above. Alternatively or additionally, the outer surface 132 of the bearing 100 may have a sliding layer that conforms to the shape of the generally cylindrical sidewall 104 with the substrate forming the inner surface 130, as formed from the composite material 1000, 1001, 1002 as described above. In other embodiments, the sliding layer may be laminated onto both surfaces of the bearing 100 and/or generally cylindrical sidewall 104.

Figure 3B:
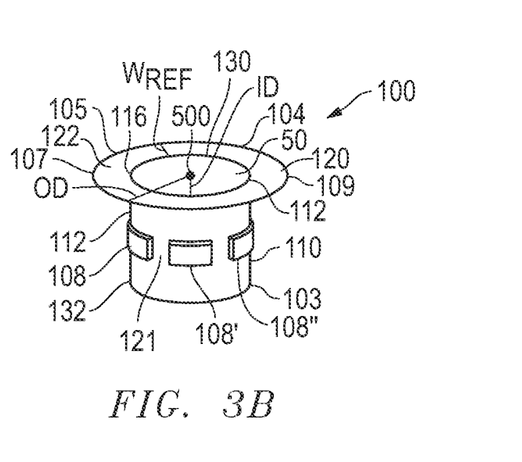
FIG. 3B includes a perspective view of one embodiment of a bearing constructed in accordance with the invention.

FIG. 3B depicts a bearing 100 including one embodiment formed from a blank of material or composite material 1000, 1001, 1002 as described above. FIG. 3B includes similar features as shown in FIG. 3A and labeled as such. For a description of those elements, please refer to the prior description of FIG. 3A. In a number of embodiments, the bearing 100 may have a non-planar shape. The bearing 100 may have an annular shape that is substantially L shaped. In other words, the bearing 100 may have an L bearing cross-section extending in the radial and axial direction as shown in FIG. 3B. Other annular shapes of the bearing are possible. In a number of embodiments, the L-shape bearing 100 may be achieved by a deep-drawing process involving stamping a formed bearing 100. The bearing 100 may include a radial bearing portion 110. The radial bearing portion 110 may be in the form of an axially extending base region 112. The radial bearing portion 10 may extend from the first axial end 103 to the second axial end 105. The radial bearing portion 110 may be on the sidewall 104 of the bearing 100. The bearing 100 may further include an axial bearing portion 120. The axial bearing portion 120 may be on the sidewall 104 of the bearing 100. The axial bearing portion 20 may be in the form of a radially extending flange 122. The axial bearing portion 120 or radially extending flange 122 may extend from the first radial end 107 to the second radial end 109. In a number of embodiments, the aperture 150 may divide the axial bearing portion 120 in the radial direction by providing a first inner radial end or edge 106 and a second inner radial end or edge 112 defining the edges of the aperture 150 within the bearing 100. In a number of embodiments, at least one of the first outer radial end 107 or second outer radial end 109 may form the outer diameter OD of the bearing 100 when measured radially from the central axis 500. In a number of embodiments, at least one of the first inner radial end 106 or second inner radial end 112 may form the inner diameter ID of the bearing 100 when measured radially from the central axis 500. In other words, the radial width of the radially extending flange 122 $W_{REF}$ may be the distance from the difference in distance of the outer diameter OD and the inner diameter ID.

In a number of embodiments, the bearing 100 may have an overall outer diameter, OD, from the central axis 500 to the outer radial end 107, 109, and the OD can be ≥0.5 mm, such as ≥1 mm, ≥5 mm, ≥10 mm, ≥15 mm, or ≥20 mm. The OD can be ≤60 mm, such as ≤30 mm, ≤20 mm, ≤15 mm, ≤10 mm, or ≤5 mm. It will be appreciated that the OD of the bearing 100 may be within a range between any of the minimum and maximum values noted above. It will be further appreciated that the OD of the bearing 100 may be any value between any of the minimum and maximum values noted above. It can also be appreciated that the OD of the bearing 100 may vary along its circumference. It can also be appreciated that OD of the bearing 100 may vary along its circumference and may vary across a plurality of bearings.

In a number of embodiments, the bearing 100 may have an overall inner diameter, ID, from the central axis 500 to a first inner radial end 106, and ID can be ≥1 mm, such as ≥5 mm, ≥7.5 mm, ≥10 mm, ≥15 mm, or ≥20 mm. The ID can be ≤50 mm, such as ≤15 mm, ≤10 mm, ≤7.5 mm, 5 mm, or 1 mm. It will be appreciated that the ID of the bearing 100 may be within a range between any of the minimum and maximum values noted above. It will be further appreciated that the ID of the bearing 100 may be any value between any of the minimum and maximum values noted above. It can also be appreciated that the ID of the bearing 100 may vary along its circumference. It can also be appreciated that ID of the bearing 100 may vary along its circumference and may vary across a plurality of bearings.

In a number of embodiments, as shown in FIG. 3A, the bearing 100 can have an overall length, L from first axial end 103 to the second axial end 105, and L can be ≥0.5 mm, ≥0.75 mm, ≥1 mm, ≥2 mm, ≥5 mm, or ≥10 mm. L can be ≤500 mm, such as ≤250 mm, ≤100 mm, ≤50 mm, or ≤25 mm. It will be appreciated that the L of the bearing 100 may be within a range between any of the minimum and maximum values noted above. It will be further appreciated that the L of the bearing 100 may be any value between any of the minimum and maximum values noted above. It can also be appreciated that the L of the bearing 100 may vary along its circumference. It can also be appreciated that L of the bearing 100 may vary along its circumference and may vary across a plurality of bearings.

Figure 3C:
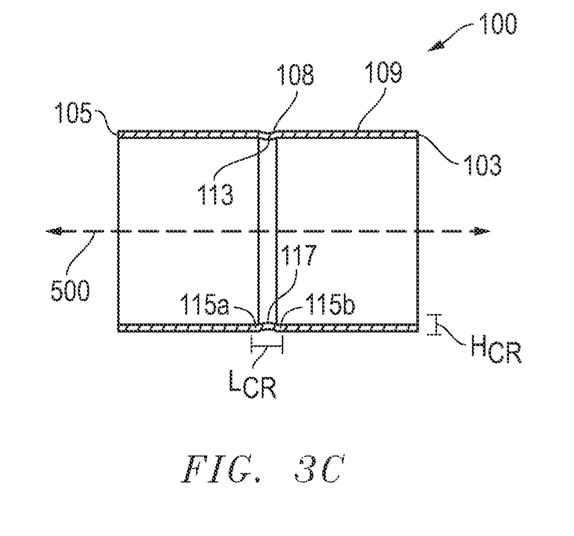
FIG. 3C includes a side cross-sectional view of one embodiment of a bearing constructed in accordance with the invention.
Figure 3D:
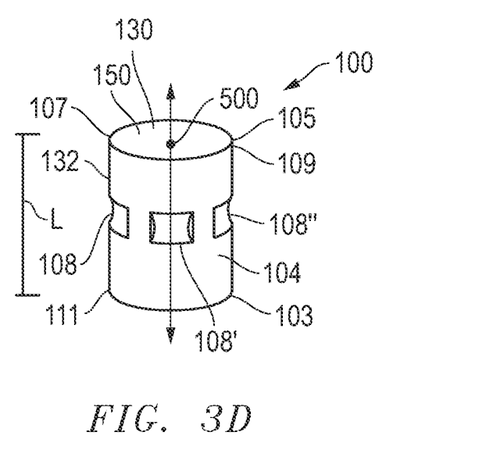
FIG. 3D includes a perspective view of one embodiment of a bearing constructed in accordance with the invention.

FIGS. 3C and 3D depict a bearing 100 including one embodiment formed from a blank of material or composite material 1000, 1001, 1002 as described above. FIG. 3C depicts a cross-sectional view of a bearing 100 including one embodiment formed from a blank of material or composite material 1000, 1001, 1002 as described above. FIG. 3D depicts a side view of a bearing 100 including one embodiment formed from a blank of material or composite material 1000, 1001, 1002 as described above. FIGS. 3C-3D include similar features as shown in FIGS. 3A-3B and labeled as such. For a description of those elements, please refer to the prior description of FIGS. 3A-3B. As shown best in FIGS. 3C but also in FIGS. 3A-3B, the bearing 100 may have at least one circumferential rib feature 108 that extend radially inward or outward from the inner surface 130 or outer surface 132 of the bearing 100 along the generally cylindrical sidewall 104. The circumferential rib feature 108 may be located on the radial bearing portion and/or the axial bearing portion (e.g. circumferentially extending flange) of the bearing 100. The circumferential rib feature 108 may be adapted to contact a mating component. For example, FIGS. 3C-3D show the circumferential rib feature 108 extending radially inward. The circumferential rib feature 108 may be formed from the composite material 1000, 1001, 1002, via stamping (e.g., pressed using a suitably shaped mold, rotary wave forming, etc.). In this way, the low friction layer of the composite material may be on the interior side of the bearing 100. There may be a flat, circumferentially extending rim 109 of composite material at at least one axial end 103, 105 of the bearing 100 above or below the circumferential rib feature 108. In an embodiment, the circumferential rib feature 108 may be continuous around the circumference of the bearing 100. In other embodiments, as shown best in FIGS. 3B and 3D, the circumferential rib feature 108 may be discontinuous around the circumference of the bearing 100. In a number of embodiments, the circumferential rib feature 108 may include a plurality of circumferential rib features 108, 108', 108". Each circumferential rib feature 108 also may be spaced from its neighboring circumferential rib feature 108 by an unformed section 121 and/or a slot of the bearing 100, which may be contiguously formed with rims 109 and spaced circumferentially between a first pair of adjacent circumferential rib feature 108. In a number of embodiments, the at least one circumferential rib feature 108 may have an aspect ratio between a circumferential length and an axial width of at least 2:1, such as at least 3:1, such as at least 4:1, such as at least 5:1, such as at least 10:1, such as at least 20:1, or such as at least 50:1. In a number of embodiments, the at least one circumferential rib feature 108 may extend at least 45° of a circumference of the bearing, such as at least 90°, at least 180°, or at least 270° of a circumference of the bearing 100. In an embodiment, the circumferential rib feature 108 may be an axially-elongated ridge that may be similar in shape to waves used on conventional bearings. In another embodiment, the circumferential rib feature 108 may have a polygonal cross-section from the central axis 3000. The circumferential rib feature 108 may include at least one polygonal angle. For example, the circumferential rib feature 108 may include a triangle or a quadrilateral shape extending from the generally cylindrical sidewall 104. In yet another embodiment, at least one of the circumferential rib features 108 may have an arcuate portion and a polygonal portion. In another embodiment, the circumferential rib feature 108 may have a semi-circular cross-section from the central axis 3000. In another embodiment, the circumferential rib feature 108 may have a variable cross-section from the central axis 3000. In an embodiment, the circumferential rib feature 108 may include a plurality of circumferential rib features 108. In an embodiment, at least two of the circumferential rib features 108 may have the same geometric shape or size as compared to each other. In a further embodiment, all of the circumferential rib features 108 may have the same geometric shape or size as compared to each other. In another embodiment, at least one of the circumferential rib features 108 may have different geometric shapes or sizes as compared to each other. In a further embodiment, all of the circumferential rib features 108 may have different geometric shapes or sizes as compared to each other.

At least one of the circumferential rib features 108 may have a circumferential length, $L_{CR}$, defined between a pair of bases 115a, 115b, and a radial height $H_{CR}$, and a circumferential hump 113 extending in the radial direction, the hump 113 rising to and falling from an apex 117 within the circumferential width and being axially bound by a pair of shoulders 111. In a number of embodiments, the circumferential length, $L_{CR}$, of the circumferential rib feature 108 includes at least 1% and no greater than 100% of a total circumference of the bearing 100. The apex 117 of the at least one circumferential rib feature 108 may be rounded or squared. In a number of embodiments, the hump may include multiple valleys and peaks (including the apex 117) in a wave-like orientation.

In operation, the bearing 100 may be located adjacent to an opposing component. In operation, the bearing 100 may be located between two opposing (mating) components. For example, it may be located in the annular space between an inner component (e.g. a shaft) and a bore in an outer component (e.g. a housing). The circumferential rib feature 108 may be compressed between the inner and outer components. In some embodiments, each circumferential rib feature 108 may act as a spring and deforms to fit the components together with zero clearance therebetween. In other words, the inner component contacts the inner surfaces 130 of the bearing 100 and the outer component contacts the outer surfaces 132 of the bearing 100. In a number of embodiments, at least one circumferential rib feature 108 may have a spring rate of not greater than 30 kN/mm, such as not greater than 25 kN/mm, such as not greater than 15 kN/mm, or such as not greater than 10 kN/mm. In a number of embodiments, at least one circumferential rib feature 108 may have a spring rate of at least 0.5 kN/mm, such as at least 1 kN/mm, or such as at least 3 kN/mm. The spring rate may vary depending on the size of the circumferential rib feature, the thickness of the generally cylindrical sidewall 102, and dimensions of the bearing 100.

Figure 4:
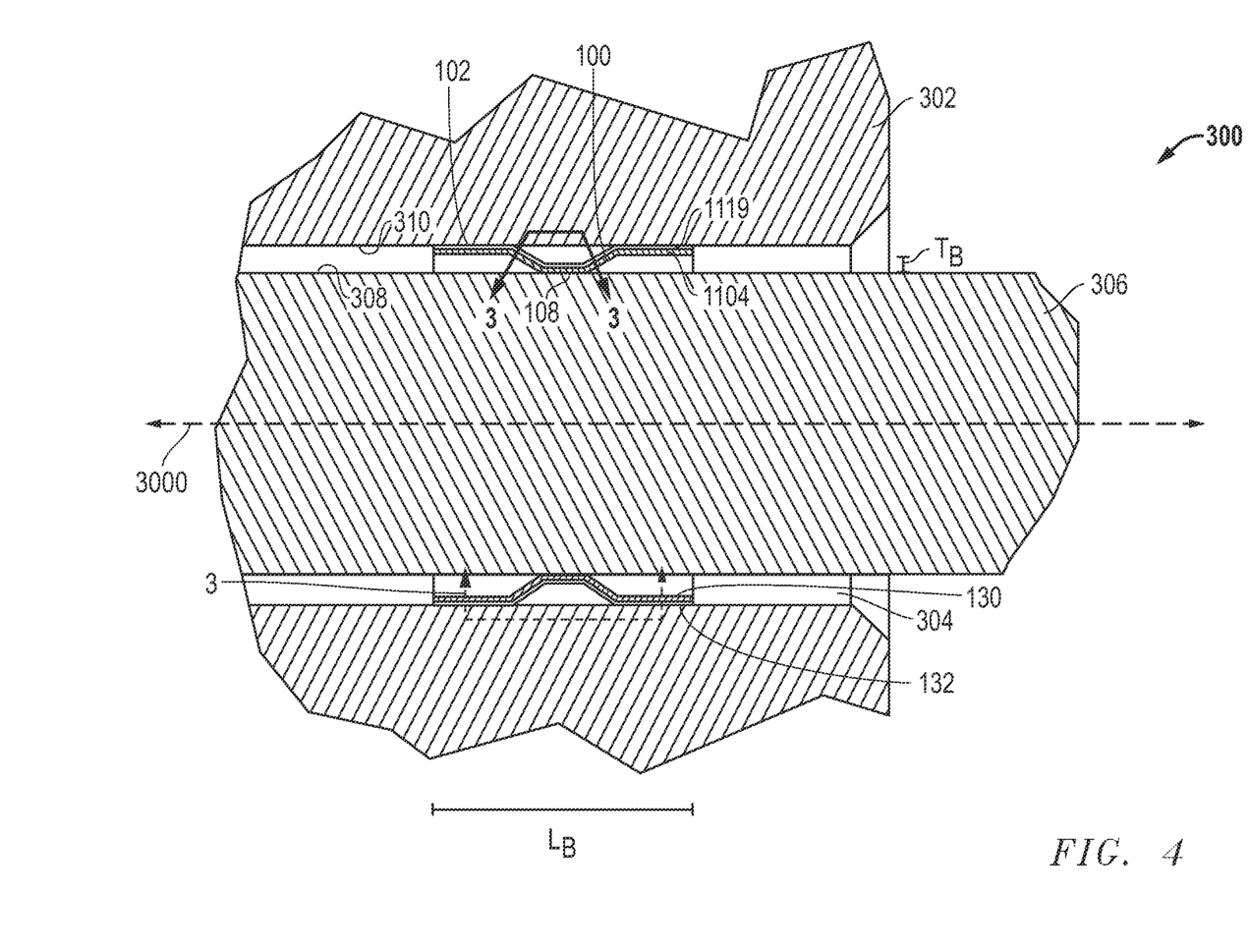
FIG. 4 includes an axial sectional view of the bearing of FIG. 3C in an assembly.

FIG. 4 depicts an axial sectional view through an assembly 300 including an embodiment of a bearing 100. The assembly 300 incorporates, for example, the bearing 100 shown in FIG. 3C. Therefore, FIG. 4 includes similar features as shown in FIGS. 3C-3D and labeled as such. For a description of those elements, please refer the prior description of FIGS. 3C-3D. The assembly 300 includes a housing 302 or outer component. The housing 302 may have an axial bore 304 formed therein, which receives a shaft 306 or inner component.

FIG. 4 shows that the bearing 100 includes a generally cylindrical sidewall 102 with the substrate 1119 on the outer surface 132 and a sliding layer 1104 on the inner surface 130. In use, the circumferential rib feature 108 of the bearing 100 may be radially compressed in the annular gap between the shaft 306 and housing 302, such that the circumferential rib feature 108 contact the inner component 306. The bearing 100 therefore reduces the annular gap to zero so there may not be a clearance between the components in the assembly 300. The bearing 100 may be secured relative to the housing 302 by frictional engagement at the contact area between the generally cylindrical sidewall 102 and the outer surface 308 of the inner component 306. The sliding layer 1104 may reduce required torque during use of the bearing 100 within the assembly 300 while maintaining a desired torque range.

An annular gap exists between the outer surface 308 of shaft 306 and the inner surface 310 of bore 304. The size of this annular gap may be variable because the diameter of the shaft 306 and bore 304 may vary within manufacturing tolerances. To prevent vibration of the shaft 306 within the bore 304, the annular gap may be filled by bearing 100 to form a zero-clearance fit between the components.

In a number of embodiments, referring back to FIGS. 2A-2C and 4, the bearing 100 may have a particular thickness $T_B$. For purposes of embodiments described herein, the thickness $T_B$ of the bearing 100 is the distance from the inner surface 130 to the outer surface 132. It will be appreciated that thickness $T_B$ of the bearing 100 may be substantially similar or the same thickness as the material or composite material 1000, 1001, 1002 as shown in FIGS. 2A-2C. According to certain embodiment, the thickness $T_B$ of the bearing 100 may be at least about 0.1 mm, or at least about 0.2 mm, or at least about 0.5 mm, or at least about 0.8 mm, or even at least about 1.5 mm. According to still other embodiments, the $T_B$ of the bearing 100 may be not greater than about 2 mm, such as, not greater than about 1.5 mm, or even not greater than about 1.0 mm. It will be appreciated that the thickness $T_B$ of the bearing 100 may be within a range between any of the minimum and maximum values noted above. It will be further appreciated that the thickness $T_B$ of the bearing 100 may be any value between any of the minimum and maximum values noted above. It can also be appreciated that the thickness $T_B$ of the bearing 100 may vary along its circumference. It can also be appreciated that the thickness $T_B$ of the bearing 100 may vary along its circumference and may vary across a plurality of bearings.

Figure 5:
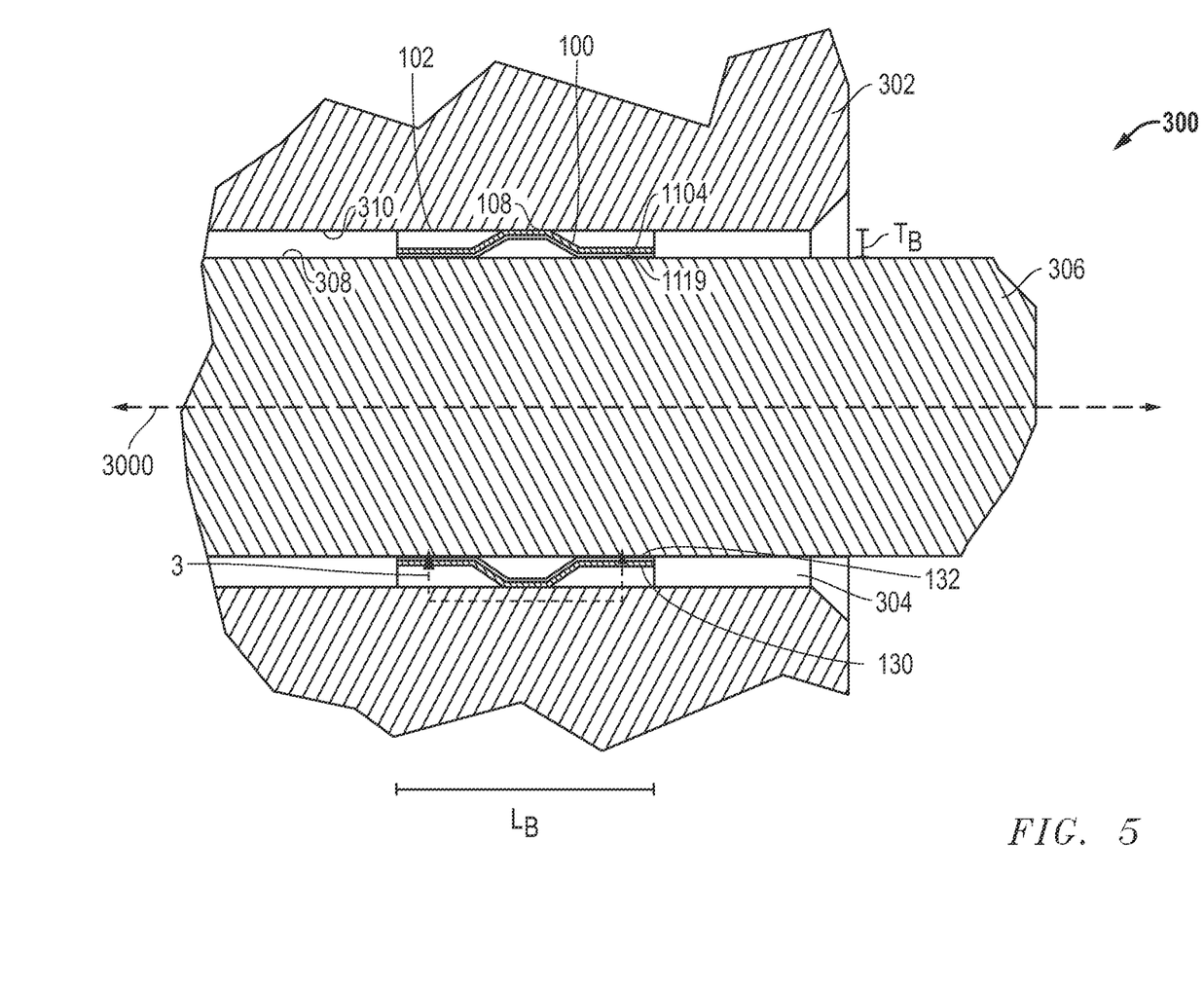
FIG. 5 includes a radial sectional view of the bearing of FIG. 3A in the assembly.

FIG. 5 depicts an axial sectional view through an assembly 300 including another embodiment of a bearing 100. The assembly 300 incorporates, for example, the bearing 100 shown in FIGS. 3A-3B. Therefore, FIG. 5 includes similar features as shown in FIGS. 3A-3B and labeled as such. For a description of those elements, please refer the prior description of FIGS. 3A-3B. The assembly 300 may also include housing 302 or outer component and shaft 306 or inner component. In the embodiment shown, the bearing 100 may be retained on the shaft 306. In this embodiment, the circumferential rib feature 108 extends radially outward toward the outer component 302. Inside the bore 304 of housing 302, the circumferential rib feature 108 may be compressed in the annular gap or space between the components at inner surface 310.

FIG. 5 shows that the bearing 100 includes a generally cylindrical sidewall 102 with the substrate 1119 on the inner surface 130 and a sliding layer 1104 on the outer surface 132. In use, the circumferential rib feature 108 of the bearing 100 may be radially compressed in the annular gap between the shaft 306 and housing 302, such that the circumferential rib feature 108 contacts the outer component 302. The bearing 100 therefore reduces the annular gap to zero so there may not be a clearance between the components in the assembly 400. The bearing 100 may be secured relative to the housing 302 by frictional engagement at the contact area between the generally cylindrical sidewall 102 and the outer surface 308 of the inner component 306. The sliding layer 1104 may reduce required torque during use of the bearing 100 within the assembly 400 while maintaining a desired torque range.

Figure 6A:
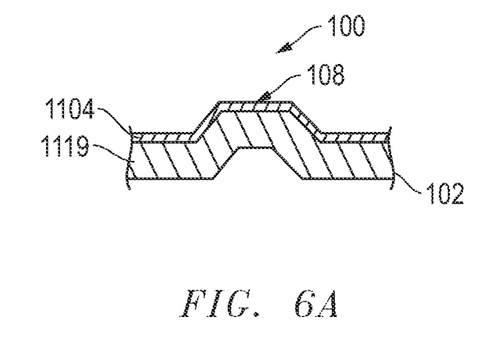
FIGS. 6A, 6B, 6C and 6D are enlarged sectional end views of an embodiment of a layer structure of a bearing, taken along the exemplary line 3-3 of FIG. 5, showing uninstalled and installed configurations, respectively.
Figure 6B:
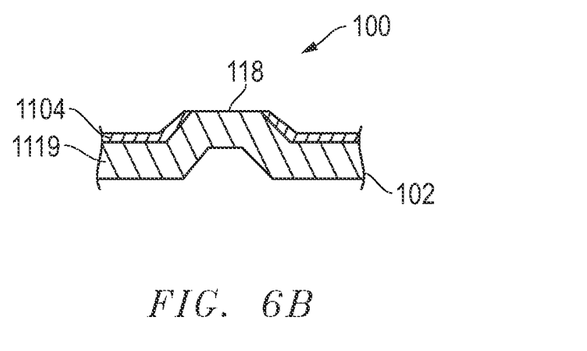
Figure 6C:
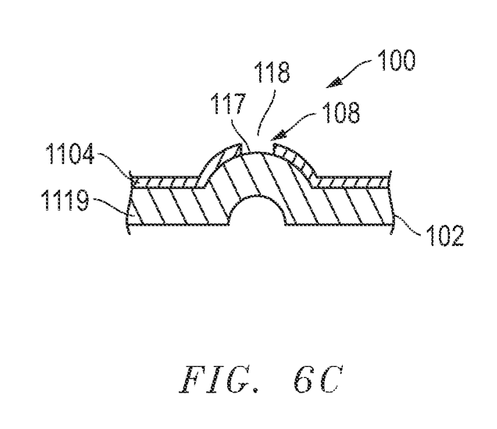

FIGS. 6A-6D include enlarged sectional end views of embodiments of a layer structure of a bearing 100 taken along the exemplary line 3-3 of FIGS. 4 and 5, showing bearings 100 in various configurations. FIGS. 6A-6D include similar features as shown in FIGS. 3A-3D and labeled as such. For a description of those elements, please refer to the prior description of FIGS. 3A-3D. In a number of embodiments, as shown in exemplary FIG. 6A, the bearing 100 may include circumferential rib features 108 that have a sliding layer 1104. This may be called an uninstalled configuration. In a number of embodiments, as shown in exemplary FIG. 6B, the bearing 100 may include circumferential rib features 108 that include a void area 118 that is free of the sliding layer 1104. The void area 118 can be located at a point of contact between the bearing 100 and an opposing component (e.g. at least one of the inner component 306 or the outer component 302), which enables the bearing 100 to be electrically conductive and provide electrical conductivity between the bearing and the inner component 306 and the outer component 302 when disposed in an assembly. Generally, the inner component 306 and the outer component 302 are electrically conductive. This may be called an installed configuration. The void area 118 may be located on or near the apex 117 of the circumferential rib feature 108. For example, as shown in FIG. 6B or FIG. 6C, some of the sliding layer 1104 may be removed prior to installation or scraped off during installation by one of the inner and outer components 306. The geometries for facilitating the removal of these materials may include configuring the diameters of the bearing 100 and circumferential rib feature 108, with respect to the inner and outer components 306, 302 and the application. For example, the outer diameter of the circumferential rib feature 108 may be slightly greater than the inner diameter of the outer component 302. Similarly, the inner diameter of the circumferential rib feature 108 may be slightly less than the outer diameter of the inner component 306. It may be contemplated that the bearing 100 may have the sliding layer 1104 removed to form the void area 118 in other ways prior to installation between the inner component 306 and the outer component 302.

Figure 6D:
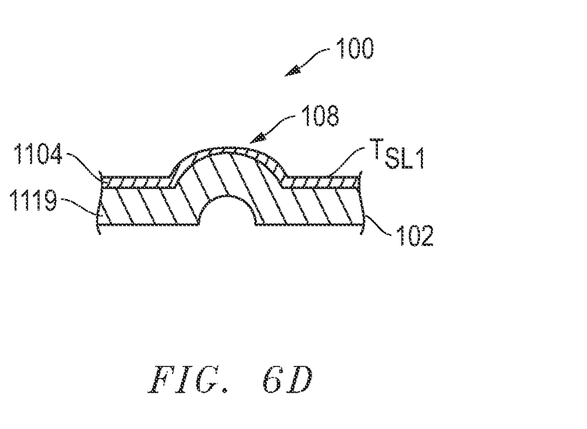

In a number of embodiments, as shown in exemplary FIG. 6D, the bearing 100 may include circumferential rib features 108 that have a sliding layer 1104 similar to FIG. 6A. In some embodiments, the bearing 100 may have a first thickness $T_{SL1}$ of the sliding layer 1104 at a first location and a second thickness $T_{SL2}$ of the sliding layer 1104 at a first location. In some embodiments, the first thickness $T_{SL1}$ of the sliding layer 1104 may be at one of the bases 115a, 115b, of the circumferential rib feature 108. In some embodiments, the second thickness $T_{SL2}$ of the sliding layer 1104 may be at or near the apex 117 of the circumferential rib feature 108. In a number of embodiments, the thickness of the sliding layer at a circumferential base of the circumferential rib feature 115a, 115b (i.e. the first location, $T_{SL1}$) may be at least 2 times greater than the thickness of the sliding layer 1104 at the apex 117 of the circumferential rib feature 108 such that the sliding layer 1104 at or near the apex 117 of the circumferential rib feature 108 (i.e. the second location, $T_{SL2}$). In this embodiment, the sliding layer 1104 at or near the apex 117 of the circumferential rib feature 108 would be removed upon application of a sheer force to remove the sliding layer 1104 from the substrate 1119 to create the void area 118.

The first thickness $T_{SL1}$ of the sliding layer 1104 at a circumferential base 115a, 115b of the circumferential rib feature 108 may be at least 2 times greater than the second thickness $T_{SL2}$ of the sliding layer 1104 may be at or near the apex 117 of the circumferential rib feature 108 such that the sliding layer 1104 at the apex 117 of the circumferential rib feature 108 may be removed upon application of a sheer force to remove the sliding layer 1104 from the substrate 1119. In some embodiments, the first thickness $T_{SL1}$ of the sliding layer 1104 at a circumferential base 115a, 115b of the circumferential rib feature 108 may be at least 3 times greater, such as 6 times greater, such as at least 8 times greater, or such as at least 10 times greater than the second thickness $T_{SL2}$ of the sliding layer 1104 may be at or near the apex 117 of the circumferential rib feature 108 such that the sliding layer 1104 at the apex 117 of the circumferential rib feature 108 may be removed upon application of a sheer force to remove the sliding layer 1104 from the substrate 1119. In a number of embodiments, the height $H_{CR}$ of the circumferential rib feature 108 may be greater than the first thickness $T_{SL1}$ and/or second thickness $T_{SL2}$ of the sliding layer 1104.

In a number of embodiments, the void area 118 may not take the entirety of the surface area of the circumferential rib feature 108. The void area 118 may just be a thin strip of the circumferential rib feature 108 where the sliding layer 1104 has been removed. In some embodiments, the void area 118 may extend along the circumferential length of the circumferential rib feature 108. In a number of embodiments, the circumferential length of the void area 118 may be at least 1% and no greater than 100% of a total circumference of the bearing. In some embodiments, the void area 118 may have a surface area of greater than 0.1 mm$^2$, greater than 1 mm$^2$, such as greater than 2 mm$^2$, such as greater than 5 mm$^2$, such as greater than 20 mm$^2$, or such as greater than 50 mm$^2$. In some embodiments, the void area 118, 218 may have a surface area of less than 100 mm$^2$, such as less than 30 mm$^2$, such as less than 10 mm$^2$, such as less than 5 mm$^2$, or such as less than 1 mm$^2$. It will be further appreciated that the void area 118 may have a surface area that may be any value between any of the minimum and maximum values noted above. It can also be appreciated that the void area 118 may have a surface area that may vary along its axial length or circumferential width and may vary across a plurality of bearings.

In this way, in some embodiments, the bearing 100 may have an uninstalled configuration or in an interim state of manufacture (see, e.g., FIG. 6A) where the bearing 100 may be electrically non-conductive or low-conductive, and an installed configuration (see, e.g., FIG. 6B) where the bearing may be electrically conductive. For example, the uninstalled configuration or interim manufactured state may have an electrical resistivity that may be greater than 10 MΩ, and the installed configuration may have an electrical resistivity that may be less than 1Ω (e.g., about 0 to 0.5Ω). Resistivity is measured from a radially outward side 132 of the bearing 100 to a radially inward side 130 of the bearing 100 along a radially extending line from the central axis 500 that intersects the bearing 100 at a circumferential rib feature at which the void area is to be formed.

In some embodiments, circumferential rib features 108 may extend both radially inward and radially outward relative to the generally cylindrical sidewall 102. In some embodiments, at least one circumferential rib feature 108 may extend both radially inward and radially outward relative to the generally cylindrical sidewall 102 of a single bearing 100 (not shown). The installed configuration may include circumferential rib features 108 that may be at least partially void of the sliding layer 1104 (see, e.g., FIG. 6B), such that the bearing 100 may be electrically conductive through the circumferential rib feature 108.

Applications for embodiments include, for example, assemblies for hinges and other vehicle components. Further, use of the bearing or assembly may provide increased benefits in several applications such as, but not limited to, door, hood, tailgate, and engine compartment hinges, seats, steering columns, flywheels, driveshaft assemblies, powertrain applications (such as belt tensioners), or other types of applications. According to particular embodiments herein, the bearings may provide electrical conductivity in assemblies with inner and outer components including antennas that may solve or reduce RFI (radio frequency interference) issues. The use of these bearings may replace existing cable solutions. In addition, bearings according to embodiments herein may decrease noise/vibration, reduce wear of the bearing surface and the mating components, and reduce complex componentry and assembly time, thereby increasing lifetime, improving visual appearance, and improving effectiveness and performance of the assembly, the bearing, and its other components.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A bearing comprising: a sidewall comprising an electrically conductive substrate, and an electrically non-conductive or low-conductive sliding layer coupled to the substrate, wherein the sidewall comprises at least one circumferential rib feature protruding radially inward or radially outward from a bore defining a central axis, wherein the at least one circumferential rib feature has an aspect ratio between a circumferential length and an axial width of at least 2:1, wherein the circumferential rib feature is adapted to contact an opposing component such that at a point of contact the bearing has a void area free of sliding layer so as to provide electrical conductivity between the bearing and the opposing component.

Embodiment 2: An assembly comprising: an outer component; an inner component; and a bearing disposed between component and second component, wherein the bearing comprises a generally cylindrical sidewall comprising an electrically conductive substrate, and an electrically non-conductive or low-conductive sliding layer coupled to the substrate, wherein the generally cylindrical sidewall comprises at least one circumferential rib feature protruding radially inward or radially outward from a bore defining a central axis, wherein the at least one circumferential rib feature has an aspect ratio between a circumferential length and an axial width of at least 2:1, wherein the circumferential rib feature is adapted to contact the outer component or the inner component at a point of contact, wherein at the point of contact, the bearing has a void area free of sliding layer so as to provide electrical conductivity between the outer component and the inner component.

Embodiment 3: An assembly comprising: an outer component having a bore defining a central axis; an inner component disposed in the bore of the outer component; and a bearing disposed between inner component and outer component, wherein the bearing comprises a generally cylindrical sidewall comprising an electrically conductive substrate, and an electrically non-conductive or low-conductive sliding layer coupled to the substrate, wherein the generally cylindrical sidewall comprises at least one circumferential rib feature protruding radially inward or radially outward from the central axis, wherein the at least one circumferential rib feature has an aspect ratio between a circumferential length and an axial width of at least 2:1, wherein the bearing has an uninstalled configuration wherein the bearing is electrically non-conductive, and an installed configuration wherein the bearing is electrically conductive, wherein electrically low-conductive is defined as having an electrical resistivity value of greater than 10 $\Omega \cdot m$ measured from a radially outward side of the bearing to a radially inward side of the bearing along a radially extending line from the central axis that intersects the bearing perpendicular to the central axis.

Embodiment 4: A method of forming and installing a bearing, comprising: providing a bearing that is electrically non-conductive or low-conductive, an inner component, and an outer component, wherein the bearing comprises a generally cylindrical sidewall comprising an electrically conductive substrate, and an electrically non-conductive or low-conductive sliding layer coupled to the substrate, wherein the generally cylindrical sidewall comprises at least one circumferential rib feature protruding radially inward or radially outward from a bore defining a central axis wherein the at least one circumferential rib feature has an aspect ratio between a circumferential length and an axial width of at least 2:1; joining the bearing to one of the inner and outer components to form a sub-assembly; and joining the other of the inner and outer components to the sub-assembly to form an assembly, such that the bearing becomes electrically conductive, and forming an electrically conductive circuit between the inner component, the bearing, and the outer component, wherein electrically non-conductive or low-conductive is defined as having an electrical resistivity value of greater than 10 $\Omega \cdot m$ measured from a radially outward side of the bearing to a radially inward side of the bearing along a radially extending line from the central axis that intersects the bearing perpendicular to the central axis.

Embodiment 5: A method of forming a bearing, comprising: providing a blank comprising an electrically conductive substrate, and an electrically non-conductive or low-conductive sliding layer coupled to the substrate; forming at least one circumferential rib feature in the blank, wherein the at least one circumferential rib feature has an aspect ratio between a circumferential length and an axial width of at least 2:1; forming the blank into a bearing comprising a generally cylindrical sidewall wherein the circumferential rib feature protrude radially inward or radially outward from the generally cylindrical sidewall, removing sliding layer from the circumferential rib feature to form a void area free of sliding layer adapted to contact an inner component or an outer component so as to provide electrical conductivity between the inner component and the outer component.

Embodiment 6: The bearing, assembly, or method of any of the preceding embodiments, wherein the at least one circumferential rib feature comprises a plurality of circumferential rib features.

Embodiment 7: The bearing, assembly, or method of any of the preceding embodiments, wherein the at least one circumferential rib feature extends at least 45° of a circumference of the bearing, such as at least 90°, at least 180°, or at least 270° of a circumference of the bearing.

Embodiment 8: The assembly of embodiment 3, wherein the at least one circumferential rib feature comprises a continuous rib.

Embodiment 9: The assembly or method of any of embodiments 3-4, wherein the circumferential rib feature comprises void area free of sliding layer adapted to contact an inner component or an outer component so as to provide electrical conductivity between the inner component and the outer component.

Embodiment 10: The bearing, assembly, or method of any of the preceding embodiments, wherein the sliding layer is disposed on an inner surface of the generally cylindrical sidewall, and the substrate is disposed on an outer surface of the generally cylindrical sidewall.

Embodiment 11: The bearing, assembly, or method of any of the preceding embodiments, wherein the sliding layer is disposed on an outer surface of the generally cylindrical sidewall, and the substrate is disposed on an inner surface of the generally cylindrical sidewall.

Embodiment 12: The bearing, assembly, or method of any of the preceding embodiments, wherein the circumferential rib feature includes a circumferential width and a radial height, and a circumferential hump extending in the radial direction, the hump rising to and falling from an apex within the circumferential width.

Embodiment 13: The bearing, assembly, or method of embodiment 12, wherein the thickness of the sliding layer at a circumferential base of the circumferential rib feature is at least 2 times greater than the thickness of the sliding layer at the apex of the circumferential rib feature such that the sliding layer at the apex of the circumferential rib feature would be removed upon application of a sheer force to remove the sliding layer from the substrate.

Embodiment 14: The bearing, assembly, or method of embodiment 13, wherein the thickness of the sliding layer at the circumferential base of the circumferential rib feature is at least 3 times greater than the thickness of the sliding layer at an apex of the circumferential rib feature, such as at least 6 times greater than the thickness of the sliding layer at an apex of the circumferential rib feature, such as at least 8 times greater than the thickness of the sliding layer at the apex of the circumferential rib feature, or such as at least 10 times greater than the thickness of the sliding layer at an apex of the circumferential rib feature.

Embodiment 15: The bearing, assembly, or method of any of embodiments 12-14, wherein the height of the circumferential rib feature is greater than the thickness of the sliding layer.

Embodiment 16: The bearing, assembly, or method of any of the preceding embodiments, wherein the sidewall further comprises a radially extending flange.

Embodiment 17: The bearing, assembly, or method of embodiment 16, wherein the radially extending flange includes the circumferential rib feature.

Embodiment 18: The bearing, assembly, or method of any of the preceding embodiments, wherein the void area is located on an apex of the circumferential rib feature.

Embodiment 19: The bearing, assembly, or method of embodiment 12, wherein the circumferential hump comprises multiple peaks including the apex.

Embodiment 20: The bearing, assembly, or method of any of the preceding embodiments, wherein the void area extends along a circumferential length of the circumferential rib feature.

Embodiment 21: The bearing, assembly, or method of embodiment 20, wherein the circumferential length of the void area comprises at least 1% and no greater than 100% of a total circumference of the bearing.

Embodiment 22: The bearing, assembly, or method of any of the preceding embodiments, wherein the circumferential length of the circumferential rib feature comprises at least 1% and no greater than 100% of a total circumference of the bearing.

Embodiment 23: The bearing, assembly, or method of any of the preceding embodiments, wherein the void area comprises a surface area of no greater than 50% of the total surface area of the sidewall.

Embodiment 24: The bearing, assembly, or method of embodiments 1, 2, 5, or 6, wherein the void area is formed upon installation between the outer component and the inner component.

Embodiment 25: The bearing, assembly, or method of embodiments 1, 2, 5, or 6, wherein the void area is formed during installation between the outer component and the inner component.

Embodiment 26: The bearing, assembly, or method of embodiments 1, 2, 5, or 6, wherein the void area is formed prior to installation between the outer component and the inner component.

Embodiment 27: The bearing, assembly, or method of any of the preceding embodiments, wherein the substrate comprises steel.

Embodiment 28: The bearing, assembly, or method of embodiment 27, wherein the metal comprises a carbon steel, spring steel, or stainless steel.

Embodiment 29: The bearing, assembly, or method of any of the preceding embodiments, wherein the sliding layer comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

Embodiment 30: The bearing, assembly, or method of any of the preceding embodiments, wherein the sliding layer has a thickness within the range of 1 to 100 microns.

Embodiment 31: The bearing, assembly, or method of any of the preceding embodiments, wherein the bearing has an inner radius within the range of 1 to 50 mm.

Embodiment 32: The bearing, assembly, or method of any of the preceding embodiments, wherein the bearing has an outer radius within the range of 2 to 60 mm.

Embodiment 33: The bearing, assembly, or method of any of the preceding embodiments, wherein the bearing has a length within the range of 2 to 100 mm.

Embodiment 34: The bearing, assembly, or method of any of the preceding embodiments, wherein the circumferential rib features extend radially inward toward the inner component.

Embodiment 35: The bearing, assembly, or method of any of the preceding embodiments, wherein the circumferential rib features extend radially outward toward the inner component.

Embodiment 36: The bearing, assembly, or method of any of the preceding embodiments, wherein the bearing has an axial gap.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of assembly and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges include each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing comprising:
a sidewall comprising an electrically conductive substrate, and
an electrically non-conductive or low-conductive sliding layer coupled to the substrate, wherein the sidewall comprises at least one circumferential rib feature protruding radially inward or radially outward from a bore defining a central axis, wherein the at least one circumferential rib feature has an aspect ratio between a circumferential length and an axial width of at least 2:1, wherein the circumferential rib feature is adapted to contact an opposing component such that at a point of contact the bearing has a void area free of sliding layer so as to provide electrical conductivity between the bearing and the opposing component, wherein the void area extends in a circumferential direction along at least a majority of a circumferential length of the circumferential rib feature.

2. The bearing of claim 1, wherein the at least one circumferential rib feature comprises a plurality of circumferential rib features.

3. The bearing of claim 1, wherein the at least one circumferential rib feature extends at least 45° of a circumference of the bearing.

4. The bearing of claim 1, wherein the circumferential rib feature includes a circumferential width and a radial height, and a circumferential hump extending in the radial direction, the hump rising to and falling from an apex within the circumferential width.

5. The bearing of claim 4, wherein the thickness of the sliding layer at a circumferential base of the circumferential rib feature is at least 2 times greater than the thickness of the sliding layer at a portion of the circumferential rib feature.

6. The bearing of claim 5, wherein the thickness of the sliding layer at the circumferential base of the circumferential rib feature is at least 3 times greater than the thickness of the sliding layer at a portion of the circumferential rib feature.

7. The bearing of claim 4, wherein the height of the circumferential rib feature is greater than the thickness of the sliding layer.

8. The bearing of claim 4, wherein the at least one circumferential rib feature comprises a plurality of circumferential rib features, wherein each circumferential rib feature of the plurality of circumferential rib features comprises an apexes.

9. The bearing of claim 1, wherein the sidewall further comprises a radially extending flange.

10. The bearing of claim 1, wherein the circumferential rib feature comprises a polygonal portion.

11. The bearing of claim 1, wherein the void area is located on an apex of the circumferential rib feature.

12. The bearing of claim 1, wherein the void area extends along a circumferential length of the circumferential rib feature, and wherein the circumferential length of the void area comprises at least 1% and no greater than 100% of a total circumference of the bearing.

13. The bearing of claim 1, wherein the circumferential length of the circumferential rib feature comprises at least 1% and no greater than 100% of a total circumference of the bearing.

14. The bearing of claim 1, wherein the void area comprises a surface area of no greater than 50% of the total surface area of the sidewall.

15. The bearing of claim 1, wherein the substrate comprises steel.

16. The bearing of claim 1, wherein the sliding layer comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

17. The bearing of claim 1, wherein the circumferential rib features extend radially inward toward the inner component.

18. The bearing of claim 1, wherein the circumferential rib features extend radially outward toward the inner component.

19. An assembly comprising:
an outer component;
an inner component; and
a bearing disposed between component and second component, wherein the bearing comprises a sidewall comprising an electrically conductive substrate, and an electrically non-conductive or low-conductive sliding layer coupled to the substrate, wherein the sidewall comprises at least one circumferential rib feature protruding radially inward or radially outward from a bore defining a central axis, wherein the at least one circumferential rib feature has an aspect ratio between a circumferential length and an axial width of at least 2:1, wherein the circumferential rib feature is adapted to contact the outer component or the inner component at a point of contact, wherein at the point of contact, the bearing has a void area free of sliding layer so as to provide electrical conductivity between the outer component and the inner component, wherein the void area extends in a circumferential direction along at least a majority of a circumferential length of the circumferential rib feature.

20. An assembly comprising:
an outer component having a bore defining a central axis;
an inner component disposed in the bore of the outer component; and
a bearing disposed between inner component and outer component, wherein the bearing comprises a sidewall comprising an electrically conductive substrate, and an electrically non-conductive or low-conductive sliding layer coupled to the substrate, wherein the sidewall comprises at least one circumferential rib feature protruding radially inward or radially outward from the central axis, wherein the at least one circumferential rib feature has an aspect ratio between a circumferential length and an axial width of at least 2:1, wherein the bearing has an uninstalled configuration wherein the bearing is electrically non-conductive, and an installed configuration wherein the bearing is electrically conductive, wherein electrically low-conductive is defined as having an electrical resistivity value of greater than 10 Ω·m measured from a radially outward side of the bearing to a radially inward side of the bearing along a radially extending line from the central axis that intersects the bearing perpendicular to the central axis, wherein the bearing has a void area free of a sliding layer so as to provide electrical conductivity between the outer component and the inner component, wherein the void area extends in a circumferential direction along at least a majority of a circumferential length of the circumferential rib feature.

* * * * *